US006510172B1

(12) United States Patent
Miller

(10) Patent No.: US 6,510,172 B1
(45) Date of Patent: Jan. 21, 2003

(54) MULTI-USER COMMUNICATION SYSTEM ARCHITECTURE WITH DISTRIBUTED TRANSMITTERS

(75) Inventor: David S. Miller, Carlsbad, CA (US)

(73) Assignee: Qualcomm, Inc., San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/139,839

(22) Filed: Aug. 25, 1998

Related U.S. Application Data

(60) Provisional application No. 60/039,803, filed on Mar. 4, 1997.

(51) Int. Cl.$^7$ ................................. H04B 1/69
(52) U.S. Cl. ...................... 375/140; 375/130
(58) Field of Search .................. 375/206, 200, 375/298, 315; 370/320, 335, 342, 316; 455/12.1, 13.4, 69

(56) References Cited

U.S. PATENT DOCUMENTS

| | | | |
|---|---|---|---|
| 4,866,395 A | 9/1989 | Hostetter | 329/319 |
| 4,888,788 A | 12/1989 | Teranishi et al. | 375/1 |
| 4,901,307 A | 2/1990 | Gilhousen et al. | 370/18 |
| 5,101,501 A | 3/1992 | Gilhousen et al. | 455/33 |
| 5,103,459 A | 4/1992 | Gilhousen et al. | 375/1 |
| 5,109,390 A | 4/1992 | Gilhousen et al. | 375/1 |
| 5,166,951 A | 11/1992 | Schilling | 375/1 |
| 5,228,054 A | 7/1993 | Rueth et al. | 375/1 |

(List continued on next page.)

FOREIGN PATENT DOCUMENTS

| | | | |
|---|---|---|---|
| EP | 0748062 | 12/1996 | H04B/7/185 |
| EP | 0755127 | 1/1997 | H04B/1/707 |
| WO | 9622661 | 7/1996 | |

OTHER PUBLICATIONS

*Digital Communications with Space Applications*, S.W. Golomb et al., Prentice Hall, Inc. 1964, pp. 45–64.

Primary Examiner—Chi Pham
Assistant Examiner—Khai Tran
(74) Attorney, Agent, or Firm—Philip R. Wadsworth; Gregory D. Ogrod

(57) ABSTRACT

A new signal processing architecture for base stations and gateways (124, 126) used in spread spectrum communication systems (100) that simplifies data transfer, reduces required bus capacity, and does not require special synchronization of signals that are to be combined. A series of transmission modules ($508_1$–$508_M$) are used to transfer data to corresponding ones of a series of analog transmitters ($412_1$–$412_M$) used to form communication circuits for each system user. Each transmission module ($508_1$–$508_M$) employs a series of encoders ($502_{MR}$) and modulators ($504_{MS}$) to form spread communication signals, using appropriate PN spreading codes. Spread spectrum communication signals from each module (508) for each system user (D), are summed together ($510_1$–$510_M$) and transferred to a single analog transmitter (412) associated with that module. The signals being combined are automatically synchronized by common timing signals used for elements within each module. The number of processing elements within each module is such that at least one processing path is available for each user or user channel over which it is desired to transmit information through the connected analog transmitter ($412_1$–$412_M$). Data is output from the modules ($508_1$–$508_M$) at a greatly reduced transfer rate which can be more easily accommodated using current technology. This is very useful for satellite based communication systems, or high capacity cellular systems, and this system architecture can be accomplished cost effectively using a series of easily manufactured circuit modules.

18 Claims, 8 Drawing Sheets

U.S. PATENT DOCUMENTS

| | | |
|---|---|---|
| 5,228,056 A | 7/1993 | Schilling .................... 375/1 |
| 5,267,261 A | 11/1993 | Blakeney et al. ............ 375/1 |
| 5,309,474 A | 5/1994 | Gilhousen et al. ........... 375/1 |
| 5,311,176 A | 5/1994 | Gurney .................... 341/50 |
| 5,442,627 A | 8/1995 | Viterbi et al. ............. 370/22 |
| 5,442,661 A | 8/1995 | Falconer .................. 375/205 |
| 5,450,453 A | 9/1995 | Frank ..................... 375/200 |
| 5,592,481 A * | 1/1997 | Wiedeman et al. ......... 370/316 |
| 5,691,974 A * | 11/1997 | Zehavi et al. .............. 370/203 |
| 5,729,570 A * | 3/1998 | Magill ..................... 375/206 |
| 5,835,847 A * | 11/1998 | Gilmore et al. ............. 455/12.1 |
| 6,240,124 B1 * | 5/2001 | Wiedeman et al. ......... 375/130 |

* cited by examiner

MULTI-USER COMMUNICATION SYSTEM ARCHITECTURE WITH DISTRIBUTED TRANSMITTERS

This application claims the benefit of Provisional Application No. 60/039,803, filed Mar. 4, 1997.

BACKGROUND OF THE INVENTION

I. Field of the Invention

The present invention relates to multiple access communication systems, such as wireless data or telephone systems, and spread spectrum communication systems using satellites. More specifically, the invention relates to a communication system architecture in which communication signals are transmitted using transmission modules employing connected sets of modulators and spreading elements coupled to respective analog transmitters, to decrease data transfer requirements. The invention further relates to a method of redistributing certain signal modulation functions in a CDMA spread spectrum communication system to decrease data transfer rates.

II. Description of the Related Art

A variety of multiple access communication systems and techniques have been developed for transferring information among a large number of system users. The use of spread spectrum modulation techniques, such as code division multiple access (CDMA), in multiple access communication systems is disclosed in the teachings of U.S. Pat. No. 4,901,307, which issued Feb. 13, 1990 under the title "Spread Spectrum Multiple Access Communication System Using Satellite Or Terrestrial Repeaters", and U.S. Pat. No. 5,691,974, which issued Nov. 25, 1997 under the title "Method And Apparatus For Using Full Spectrum Transmitted Power In A Spread Spectrum Communication System For Tracking Individual Recipient Phase Time And Energy," which are both assigned to the assignee of the present invention, and incorporated herein by reference.

These patents disclose wireless communication systems in which a number of generally mobile or remote system users or subscribers employ transceivers to communicate with other system users or desired signal recipients, such as through a public telephone switching network. The transceivers typically communicate through gateways and satellites, or base stations (also referred to as cell-sites or cells) using code division multiple access (CDMA) spread spectrum type communication signals.

Base stations cover cells, while satellites have footprints on the surface of the Earth. In either system, capacity gains can be achieved by sectoring, or subdividing, the geographical regions being covered. Cells can be divided into "sectors" by using directional antennas at the base station. Similarly, a satellite's footprint can be geographically divided into "beams", through the use of beam forming antenna systems. These techniques for subdividing a coverage region can be thought of as creating isolation using relative antenna directionality or space division multiplexing. In addition, provided there is available bandwidth, each of these subdivisions, either sectors or beams, can be assigned multiple CDMA channels through the use of frequency division multiplexing (FDM). In satellite communication systems, each CDMA channel can be referred to as a "sub-beam" because there may be several of these channels per "beam", or occupying the area covered by a beam.

In a typical spread-spectrum communication system, one or more, generally a set or pair of, preselected pseudonoise (PN) code sequences are used to modulate or "spread" user information signals over a predetermined spectral band prior to modulation onto a carrier signal for transmission as communication signals. PN spreading, a method of spread-spectrum transmission that is well known in the art, produces a signal for transmission that has a bandwidth much greater than that of the data signal. In the base station- or gateway-to-user communication link, PN spreading codes or binary sequences are used to distinguish between signals transmitted by different base stations or over different beams, as well as between multipath signals. These codes are typically shared by all communication signals within a given CDMA channel or sub-beam.

Orthogonal channelizing codes are used to reduce interference and discriminate between different users within a cell or between user signals transmitted within a satellite sub-beam on a forward link. That is, each user terminal has its own orthogonal channel provided on the forward link by using a unique "covering" orthogonal code. Walsh functions are generally used to implement channelizing codes, with a typical length being on the order of 64 code chips for terrestrial systems and 128 code chips for satellite systems.

In addition, some form of signal diversity is used to reduce the deleterious effects of fading and additional problems associated with relative user, or satellite, movement within a communication system. Generally, three types of diversity are used in spread spectrum communication systems, including time, frequency, and space diversity. Time diversity is obtainable using error correction coding or simple repetition and time interleaving of signal components. A form of frequency diversity is inherently provided by spreading the signal energy over a wide bandwidth. Therefore, frequency selective fading affects only a small part of the CDMA signal bandwidth. Space diversity is provided using multiple signal paths, typically, through different antennas or communication signal beams.

Base stations for terrestrial cellular communication systems typically use six antennas, two per each of three sectors in a sub-divided cell. Some designs plan for using additional antennas and polarization modes, providing additional CDMA channels. Base stations used with satellites, also referred to as gateways or hubs, use an array of transmitters, on the order of 32 or more, connected to one or more antennas to accommodate multiple beams on each carrier frequency. also provide service to multiple satellites, typically on the order of three or four at any given time. In one exemplary system, on the order of six satellites are used in each of eight orbital planes and even more satellites are contemplated for some systems. In addition, the number of communication channels or circuits per sub-beam in a satellite is on the order of 128 channels rather than the 64 typically found in terrestrial cellular systems. These factors greatly increase the amount of data and signal processing that must be accommodated within a system gateway as opposed to typical base stations.

When information, including voice, in the form of digital data is to be transferred to system users or subscribers by a gateway it is first encoded and interleaved as desired, and then "covered" and "spread" using appropriate orthogonal and spreading codes. Each data signal is processed by at least one modulator for each analog signal path over which it is to be transferred, for diversity purposes. The spread encoded data is then transferred to one or more analog transmitters where it is up-converted to an appropriate intermediate frequency and used to modulate a carrier waveform to form a desired communication signal.

Each analog transmitter represents one pre-selected diversity signal path for a signal, and multiple user signals are typically transferred through each analog transmitter, at any time. The signals for each analog transmitter are received from an array or number of modulator elements within the gateway, or base station, which are each assigned to process communications for particular users using particular signal path diversities. The signals from several modulators are combined to form a single output waveform for each analog transmitter. This means that data intended for each analog transmitter must be transferred along common busses or cable assemblies connected to the outputs of all modulators. That is, all modulators and analog transmitters are interconnected or connected using one set of common data busses in order to potentially process multiple path (diversity) signals for any given combination of analog transmitter, antenna, satellite, and user.

For current traffic channel data rates found within communication systems, the gateway busses transferring signals between digital modulators and analog transmitters would have to handle on the order of several gigabits-per-second (Gbps) or more. The output of each modulator provides data at rates on the order of 40 megabits-per-second (Mbps). Potentially, signals for up to 128 user channels can be transmitted on each CDMA channel or frequency using from 2 to 64 diversity paths. This results in total data bus transfer rates in excess of 5–10 Gbps (for example, 40 Mbps×128× 2). Data transfer rates of this magnitude exceed the current limits of commercially viable bus transfer structures, within reasonable cost and reliability constraints. In addition, cabling and physical interconnection structures for transferring this volume of data among various processing circuit structures also becomes prohibitively complex and potentially unreliable. Higher capacity terrestrial or cellular base stations will also probably have similar processing or data transfer demands in the future.

The control, switching, timing, and so forth, that must be implemented for this data transfer volume is also prohibitively complex for use in cost effective gateway systems. The relative timing of each user signal being transferred to a given analog transmitter must be synchronized to within less than one-half of the chip interval for the spreading code being used, for all other user signals being transferred to the same analog transmitter, in order to be combined for transmission by a common analog transmitter. Such synchronization requires unduly complex and sophisticated control mechanisms, and impacts signal processing flexibility.

Therefore, it is desirable to reduce the quantity of data that must be transferred from one functional element or stage to another within the architecture of a gateway or base station, especially for satellite systems. It is also desirable to make more efficient use of lower cost modular components to provide for easy implementation of complex signal processing structures in a cost effective manner.

SUMMARY

In view of the above and other problems found in the art relative to processing communication signals in gateways or base stations in spread spectrum communication systems, one purpose of the present invention is to distribute signal processing requirements for modulating orthogonal channels within communication signals to be transmitted from a gateway or base station.

A second purpose of the invention is to decrease the total volume of data per unit time that is transferred along common signal busses between digital and analog signal processing sections of a gateway in a spread spectrum communication system.

Another purpose is to provide a technique that allows for a more cost effective allocation of processing resources in association with each analog transmitter in a gateway.

One advantage of the invention is that it uses spread spectrum and other digital signal processing modules that are very reliable, easy to manufacture, and cost effective to distribute into parallel arrays for use with gateway analog transmitters.

Other advantages of the invention is that it simplifies data transfer, reduces required bus capacity, and does not require special synchronization of signals that are to be combined into a single analog output. The invention reduces data transfer rates on circuit backplanes, and the number of cables, conductors, or other distribution elements required.

These and other purposes, objects, and advantages are realized in a signal processing architecture for use within a base station in a spread spectrum multiple access communication system, such as code division multiple access (CDMA) type wireless telephone/data communication systems. In these systems, users or system subscribers communicate through base stations or satellites and gateways, using different encoded communication signal channels within given carrier frequencies or CDMA channels. Digital data signals intended for transmission to one or more system users are each transferred to one or more of a plurality of transmission modules, each being associated with a corresponding analog output communication path over which data signals are to be transferred. The number of modules to which each user data signal is transferred is equal to the number of analog communication paths over which it is desired to transfer a given user data signal.

Within each transmission module, the digital data signals are received and encoded, and generally also interleaved, to produce encoded data symbols. The encoded data symbols are then also spread or spread spectrum modulated using at least one preselected pseudorandom noise (PN) spreading code, to form spread communication signals. The outputs for each of a plurality of spread spectrum modulators in each each module are summed together and transferred to a single analog transmitter associated with the transmission module. The analog transmitter forms part of a given analog communication signal output path. This produces a single spread communication signal or channel at a preselected carrier frequency for each module and corresponding analog transmitter.

The transmission modules are defined by or each comprise an encoding and/or interleaving section, and a modulation or channelizing and spreading section. An array of encoders, and when desired corresponding interleavers, form the encoding section, while an array of spread spectrum modulators form the modulation section.

In some embodiments, there are an equivalent number of interleavers and modulators. However, in other embodiments some predetermined degree of time sharing for these elements can be employed. In these configurations, a preselected number of encoders and/or interleavers are used which is less than the total number of user channels to be accommodated by the analog transmitter. The number corresponding spread spectrum modulators is generally larger than the number of encoders and/or interleavers, but may still be less than the total number of users or user channels. Multiplexing of signals may be used in some configurations.

User data or information to be transmitted to one or more users is received and encoded by the encoding section, and the resulting encoded data is processed in the spreading section to generate spread data symbols for each diversity path for each user. The number of processing elements, primarily encoders and spreading elements, within each module is such that at least one processing path is available for each user or user communication channel over which it is desired to transmit information through using a given analog transmitter. The invention allows a large degree of modular construction and circuit integration for purposes of cost reduction and reliability.

In further embodiments of the invention, the encoded data symbols for each analog communication path intended for a given user are covered with one of a plurality of orthogonal functions. The same function is used for each signal transferred on each analog communication path for a given user. Orthogonal code transformers or transformation circuits are also disposed in the transmission modules and work with the spreading sections to perform orthogonal transformations or mappings on encoded data symbols. This generates representative orthogonal user channel data for each user channel operating through a corresponding analog transmitter. Walsh functions are generally used for the orthogonal functions.

In still further embodiments of the invention, the modulation modules spread each of the digital communication signals using preselected in-phase (I) and quadrature (Q) phase pseudorandom noise (PN) code sequences for the particular communication system, with off-sets or time shifts as appropriate. These preselected pseudonoise (PN) sequences are also used to demodulate the in-phase and quadrature signal components when the signals are received by intended recipients.

In this manner, a number of communication or user information signals are transmitted over one or more diversity transfer paths for multiple system users using analog transmitters associated with transmission modules that encode, interleave, and spread the signal, which are transmitted on at least one carrier frequency. The analog transmitters convert digital communication signals to analog communication signals at predetermined sampling rates.

The present invention is very useful for reducing the complexity of signal transfer structures in gateway type base stations which are communicating with at least one satellite based repeater to transfer the communication channel signals to user terminals within the communication system from analog transmitters. This is especially useful where there are at least two satellites in communication with the gateway at any given time.

BRIEF DESCRIPTION OF THE DRAWINGS

The features, objects, and advantages of the present invention will become more apparent from the detailed description set forth below when taken in conjunction with the drawings in which like reference characters identify like elements throughout and wherein:

FIG. 4b illustrates a more general form of the gateway architecture of FIG. 4a;

FIG. 5b illustrates a more general form of the gateway architecture of FIG. 5a.

DETAILED DESCRIPTION OF THE PREFERRED EMBODIMENTS

The present invention provides a new signal processing architecture for base stations and gateways used in spread spectrum communication systems. The method and apparatus of the present invention transfers data signals intended for each of a series of analog transmitters, used to form communication circuits or links for system users, to transmission modules associated with each analog transmitter. Each transmission module has a series or set of signal modulators which can be assigned to each of the signals to be accommodated by a single corresponding analog transmitter. The signals are first encoded and interleaved as desired by encoders connected in series with each modulator and then modulated using appropriate PN spreading codes. Common timing signals or controls are used for each set of modulators within each transmission module, or assigned to a given analog transmitter, resulting in automatically synchronized modulated data signals. These signals can be easily summed or combined. The final combined signal is then introduced into the associated analog transmitter for transmission to system users.

Data is output from digital signal processing stages within a gateway at a reduced bit rate which can be more easily accommodated or manipulated using current technology. Data provided from this processing level is more readily transferred to a series of encoders at lower data rates than traditional encoded/interleaved/spread data symbols for a large number of outbound communication signals. This is very useful for satellite based communication systems, or higher capacity cellular systems. The transmission layers of this system architecture can be accomplished cost effectively using a series of easily manufactured circuit modules.

Figure 1:
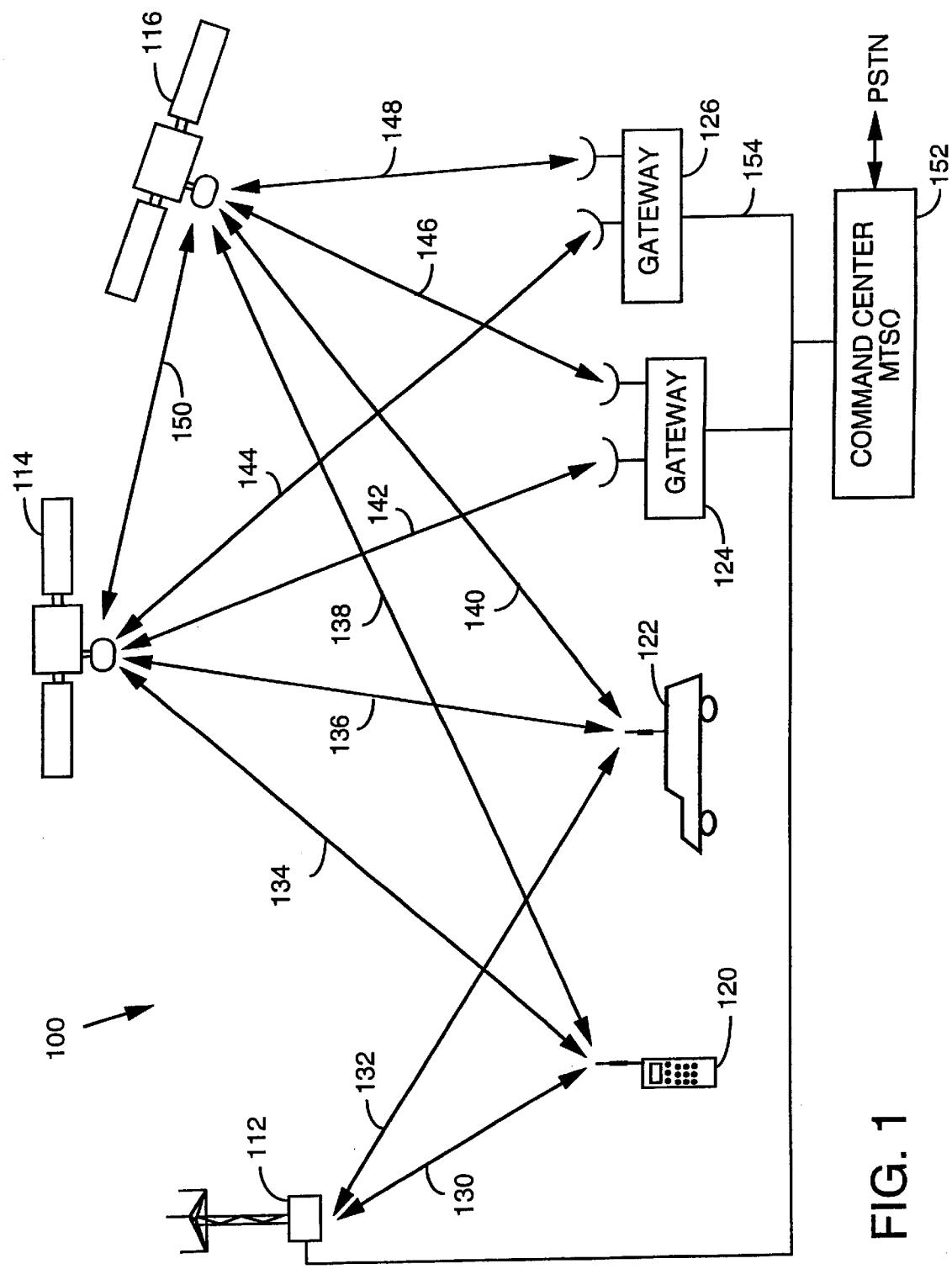
FIG. 1 illustrates an exemplary wireless communication system.

An exemplary wireless communication system, such as a wireless telephone system, in which the present invention is used is illustrated in FIG. 1. A communication system 100 illustrated in FIG. 1 uses spread spectrum modulation techniques in communicating between communication system remote or mobile user terminals and system gateways or base stations. In the portion of the communication system illustrated in FIG. 1, one base station 112 and two satellites 114 and 116, and two associated gateways or hubs 124 and 126 are shown for effecting communications with two user terminals 120 and 122.

User terminals 120 and 122 each have or comprise a wireless communication device such as, but not limited to, a cellular telephone. Typically, such units are either handheld or vehicle mounted as desired. Other wireless devices are also contemplated such as message receivers and data transfer devices (e.g., portable computers, personal data assistants, modems, fax machines). Here, user terminal 120 is illustrated as a portable handheld telephone. While these user terminals are discussed as being mobile, it is also understood that the teachings of the invention are applicable to fixed units or other types of terminals where remote wireless service is desired. This type of service is particularly relevant to establishing communication links in many remote areas of the world otherwise lacking a communications infrastructure. This includes for example, fixed stations or phones, pay phones, wireless local loop services, or remote data retrieval or analysis devices and equipment. The latter being useful where extremely remote, or inhospitable or harsh environments are involved.

The terms base station, gateway, and hub are sometimes used interchangeably in the art, with gateways generally understood as comprising specialized base stations that direct communications through satellites. User terminals are also referred to as subscriber units, mobile stations, or simply "users," "mobiles," or "subscribers" in some communication systems, depending on preference.

In FIG. 1, some possible signal paths are illustrated for communications, communication links, or "circuits" being established between user terminals 120 and 122 and base station 112, or through satellites 114 and 116 to one or more gateways or centralized hubs 124 and 126. The base station-user terminal portions of communication links between base station 112 and user terminals 120 and m are illustrated by lines 130 and 132, respectively. The satellite-user portions of communication links between gateways 124 and 126 and user terminals 120 and 122 through satellite 114 are illustrated by lines 134 and 136, respectively. The satellite-user portions of communication links between gateways 124 and 126 and user terminals 120 and 122 through satellite 116 are illustrated by lines 138 and 140, respectively. The gateway-satellite portions of these communication links are illustrated by a series of lines 142, 144, 146, and 148. The arrowheads on these lines illustrate exemplary signal directions for each communication link, as being either a forward or a reverse link, only for purposes of clarity and not as any limitation. In some configurations, it may also be possible to establish direct satellite-satellite communications such as over a link indicated by line 150.

As seen in FIG. 1, communication system 100 generally uses one or more system control centers and switch network 152, also referred to as a Mobile Telephone Switching Office (MTSO) in cellular systems, or a Ground Operations and Control Center (GOCC) in satellite communications systems. System controller 152 typically includes interface and processing circuitry for providing system-wide control for gateways, satellites, or base stations, to maintain system-wide traffic control and signal synchronization, such as for PN or orthogonal code allocation and timing. System controller 152 also controls general routing of telephone calls between public switched telephone networks (PSTN) and gateways, and user terminals. However, each gateway generally has a PSTN or similar interface for connection to such networks. Communication links 154 that couple system controller 152 to various system gateways or base stations can be established using known techniques such as, but not limited to, dedicated telephone lines, optical fiber links, or microwave or dedicated satellite communication links.

While only two satellites are illustrated in FIG. 1, the communication system generally employs multiple satellites 114 and 116 traversing different orbital planes. A variety of multi-satellite communication systems have been proposed with an exemplary system employing on the order of 48 or more satellites, traveling in eight different orbital planes in Low Earth Orbit (LEO). However, those skilled in the art will readily understand how the teachings of the present invention are applicable to a variety of satellite system, gateway, or base station configurations, including other orbital distances and constellations.

It is contemplated for this example that base station 112 provides service over one individual geographic region or "cell", while multiple beams from satellites 114 and 116 are directed to cover other generally non-overlapping respective geographic regions. Generally, multiple beams at different frequencies, also referred to as CDMA channels, "sub-beams", or FDM signals or channels, can be directed to overlap the same region. However, it is readily understood that the beam coverage or service areas for different satellites and cellular base stations may overlap completely or partially in a given region depending on the communication system design and the type of service being offered. For example, each may provide service to different sets of users with different features at different frequencies, and a given user terminal may use multiple frequencies and multiple service providers with overlapping geophysical coverage. Accordingly, at various points in the communication process hand-offs may be made between base stations or gateways servicing the various regions or cells, and diversity may also be achieved between any of these communication regions or devices in some systems.

Space or path diversity is obtained within communication system 100 by providing multiple signal paths through simultaneous links with a mobile station or user terminal through two or more base stations (or sectors), for terrestrial-based repeater systems, or two or more satellite beams or individual satellites, for satellite systems. That is, path diversity may be obtained by transmitting or receiving communications for a single user using multiple communication paths (antennas or transceivers). Furthermore, path diversity may be obtained by exploiting a multipath environment by allowing a signal arriving over different paths, each with a different propagation delay, to be received and processed separately for each path. If two or more paths are available with sufficient delay differential, say greater than one microsecond, two or more receivers may be employed to separately receive these signals.

Examples of using path diversity in multiple access communication systems are illustrated in U.S. Pat. No. 5,101,501 entitled "Soft Handoff In A CDMA Cellular Telephone System," issued Mar. 31, 1992, and U.S. Pat. No. 5,109,390 entitled "Diversity Receiver In A CDMA Cellular Telephone System," issued Apr. 28, 1992, which are both incorporated herein by reference.

Exemplary spread spectrum type communication systems, such as those discussed in the previously-mentioned patent documents and shown in FIG. 1, use a waveform based on a direct sequence pseudorandom noise (PN) spread-spectrum carrier. That is, a signal to be transmitted is modulated using a pseudorandom noise (PN) binary sequence, or pair of sequences, to achieve a desired spreading effect. PN codes are used to spread the spectrum of all communications signals transmitted over gateway-to-user links to distinguish between signals transmitted over different sub-beams, and to discriminate between multipath signals. Such PN sequences are generally referred to as "spreading" codes.

Each PN sequence consists of a series of "chips" occurring over a preselected PN code period at a frequency much higher than the baseband communications signal being spread. An exemplary chip rate for satellite systems is around 1.2288 MHz or Mcps (Mega-chips per second) with a PN code sequence length of 1024 chips. However, the present invention is also useful with other chip rates and code lengths, as will be apparent to those skilled in the relevant art. For instance, some terrestrial cellular systems use spreading codes having $2^{15}$=32,678 chips. Each communications system design specifies the type and distribution of spreading codes within a communications system according to criteria well known in the art, such as the total bandwidth desired or allowable signal interference. An exemplary generation circuit for these sequences is disclosed in U.S. Pat. No. 5,228,054 entitled "Power Of Two Length Pseudo-Noise Sequence Generator With Fast Offset Adjustments," issued Jul. 13, 1993, which is assigned to the assignee of the present invention, and is incorporated herein by reference.

Several carrier waveforms can be used within communication system 100, with a typical embodiment employing a sinusoidal carrier that is modulated by a pair of binary PN sequences. In this approach, the sequences are generated by two different PN generators of the same sequence length. One sequence bi-phase modulates an in-phase channel (I Channel) of the carrier and the other sequence bi-phase modulates a quadrature phase or just quadrature channel (Q Channel) of the carrier. The resulting signals are summed to form a composite signal.

In a typical configuration, all signals transmitted by a gateway or base station share the same PN spreading codes for both I and Q channels, with one code being offset in phase from the other. The signals are also encoded or covered with an orthogonal code generated by using Walsh functions, as noted above. The Walsh function size or length used is typically on the order of 128 chips creating up to one hundred and twenty-eight different orthogonal communication signals or forward link channels, for each carrier frequency. One or more of these sequences may be dedicated to pilot, synchronization and paging channel functions (one or more), for each sub-beam (CDMA channel or signal). A signal addressed to a particular user is combined with the PN spreading code or codes and the particular Walsh sequence, or sequence of Walsh chips, assigned by the gateway or communication system controller. An orthogonal function, Walsh code, creates an orthogonal channel in the spread spectrum signal. A user terminal is assigned to employ a particular Walsh code to place the user terminal on a particular orthogonal channel for a communication link. This CDMA channel coding (covering) on the forward link produces user signals also referred to as traffic signals or traffic channels.

In synchronization, paging, or voice or traffic channels or signals, input data is digitized as necessary, typically encoded, provided with repetition, and then interleaved to provide error detection and correction functions. This allows the communication system to operate with lower signal-to-noise and interference ratios. The repetition process assures that the data or encoded data symbols are transferred at a preselected rate. For example, 4800 bps data symbols could be repeated once, and 2400 bps data symbols four times within a data frame to acquire a desired 9600 bps rate. Techniques for encoding, repetition and interleaving are well known in the art.

The symbols in the error correction encoded symbol stream for each channel are then combined with an assigned orthogonal code sequence or channelizing code, as discussed above, and with the PN spreading codes creating basic digital communications signals. Alternatively, the channelizing and spreading codes may be combined with each other first. The resulting spread symbol streams for each signal are then added together to form a composite waveform.

A single PN code sequence, or pair of sequences, is generally employed for the spreading function in a communications system. Signals for different beams are generally differentiated by providing different time offsets of the basic PN code sequence for each beam relative to its neighbors. That is, user terminals operating within the service area of a given beam share a single PN spreading code time offset, while other beams use different offsets of the same PN code. The basic signal timing established by each gateway for users being served on a given frequency (CDMA channel) is the same. Alternatively, beams can be differentiated by providing different PN code sequences (different polynomial) for each beam or sub-beam.

The resulting PN-spread and orthogonally-encoded output signals are then typically bandpass-filtered and modulated onto an RF carrier. This is typically accomplished by bi-phase modulating a quadrature pair of sinusoids that are summed into a single communications signal. The resulting signals may be further amplified and filtered before being summed with other forward link signals and radiated by an antenna for the gateway. The filtering, amplification, and modulation operations are well understood in the art. Alternate embodiments may interchange the order of some of these operations for forming a gateway transmitted signal. Additional details on the operation of this type of transmission apparatus are found in U.S. Pat. No. 5,103,459, issued Apr. 7, 1992, entitled "System And Method For Generating Signal Waveforms In A CDMA Cellular Telephone," which is incorporated herein by reference.

Figure 2:
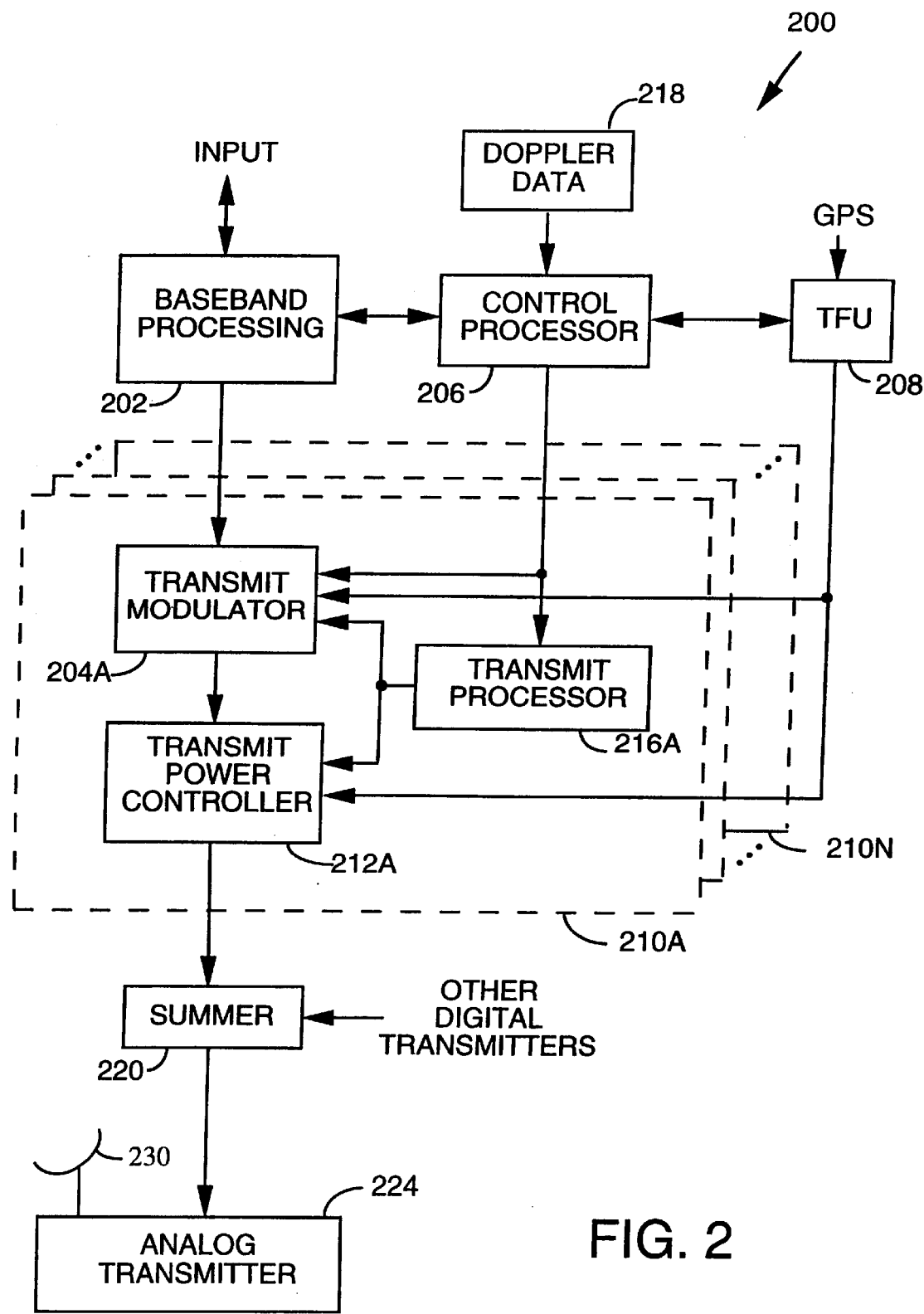
FIG. 2 illustrates exemplary gateway modulation and signal transmission apparatus for the wireless communication system of FIG. 1.

Exemplary transmission apparatus 200 for use in base stations or gateways used to implement a CDMA communication system is illustrated in further detail in FIG. 2. In a typical base station, transmitter sections or systems are utilized, each having separate analog transmitters, and sometimes separate antenna, for effecting space diversity transmission. In a gateway, multiple analog transmitters are utilized to achieve frequency diversity, as discussed earlier. That is, in a gateway, each analog transmitter transmits different frequency signals through different satellite beams or sub-beams. As desired, and cost permitting, separate antennas are also used to effect some of this signal transmission. In either case, communication signals are processed substantially the same in each of the modulator sections and then undergo a combination process.

When voice or other data is prepared as an output message or communications signal for a user terminal, user baseband circuitry or processing elements 202 is used to receive, store, process, and otherwise prepare the desired data for transmission. Baseband circuitry 202 comprises apparatus well known in the art and not illustrated in further detail here. Exemplary baseband apparatus includes a variety of known elements such as, but not limited to, vocoders, data modems, analog-to-digital converters, and digital data switching and storage components. Baseband circuitry 202 receives inputs such as voice (analog), digital data, or messages and provides digital data to one or more transmit modulators 204 operating under the control of at least one control processor 206.

Gateway control processor 206 is electrically coupled to transmit modulators 204 and baseband circuitry 202. Control processor 206 provides command and control signals to effect functions such as, but not limited to, signal processing, timing signal generation, power control, handoff control, diversity path selection, and system interfacing. In addition, control processor 206 assigns PN spreading codes, orthogonal code sequences, and specific transmitters or modules for use in user communications. Control processor 206 also controls the generation and power of pilot, synchronization, and paging channel signals. Control processor 206 is implemented using known processing elements such as digital signal processors, microprocessors, computers, and other elements that may operate under software or firmware control.

As shown in FIG. 2, a time and frequency unit (TFU) 208 can be used to provide timing and frequency reference signals for the various processing elements in the gateway. A TFU typically uses a GPS receiver (not shown) to acquire Universal Time (UT) signals to maintain synchronization across the communications system. Central controllers can also provide such information in some configurations. TFU 208 can be configured to operate with other circuits or circuit elements, such as clock signal generators, to retard or advance the relative timing of (clock) signals, under processor control, by predetermined amounts, as desired.

Signals to be transmitted to user terminals, then, are each electrically coupled to one or more appropriate digital transmitters 210A–N. A typical gateway uses a number of such transmit transmitters 210 to provide service to many user terminals simultaneously, and for several satellites and beams simultaneously. The number of transmission transmitters 210A–N used by a gateway is determined by factors well known in the art, including system complexity, number of satellites usually in view, user capacity, degree of diversity chosen, and the like, as discussed elsewhere.

A transmit modulator 204A–N within each digital transmitter spread-spectrum modulates data for transmission and generally has an output electrically coupled to a digital transmit power controller 212, which controls the transmission power used for the outgoing digital signal.

The output of each transmit power controller 212 (A–N) is transferred to a summer 220 where it is summed with the outputs from other transmit power control circuits. Those outputs are signals for transmission to other user terminals at the same frequency and within the same beam as the output of transmit power controller 212 (A–N). The output of summer 220 is provided to an analog transmitter 224 for digital-to-analog conversion, conversion to the appropriate RF carrier frequency, further amplification, filtering, and output to one or more antennas 230 for radiating to satellites and/or user terminals.

While control processor 206 can be electrically coupled directly to the modulator (204A–N) or power controller elements (214A–N), these elements are sometimes grouped together into transmitters 210A–N, and each generally comprises a transmitter-specific processor, such as transmit processor 216A–N, which controls the elements of that digital transmitter. Thus, in a preferred embodiment, control processor 206 is electrically coupled to transmit processor 210A–N, as shown in FIG. 2. In this manner, a single control processor 206 can control the operations of a large number of digital transmitters and resources more efficiently. Transmit processor 210 controls generation of, and signal power for, pilot, synchronization, paging signals, and traffic channel signals, and their respective coupling to a power controller 212A–N When desired one or more frequency or timing precorrection elements (not shown) may be used by the gateway. Preferably, such elements are used to adjust signal frequency or timing at baseband frequency, using well known techniques. Precorrection of signal parameters is discussed in further detail in U.S. patent application Ser. No. 08/733,490 filed Sep. 30, 1996, entitled "Time And Frequency Precorrection For Non-Geostationary Satellite Communication Systems," which is incorporated herein by reference.

Figure 3:
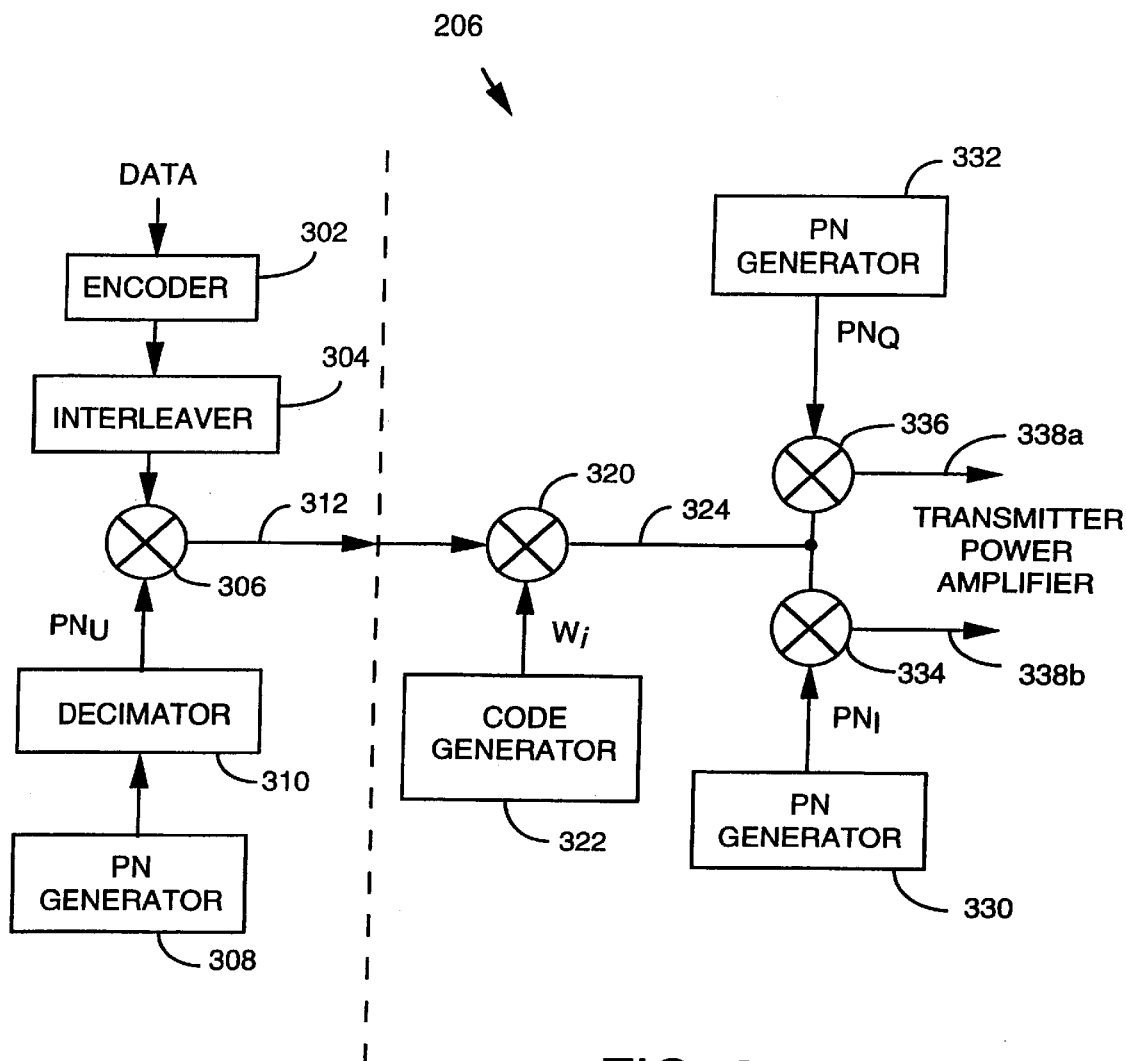
FIG. 3 illustrates exemplary modulation circuitry useful for constructing the transmitter modules shown in the apparatus of FIG. 2.

An exemplary signal modulator design for implementing transmission modulators 204A–N is illustrated in FIG. 3. In FIG. 3, an encoder 302 and an interleaver 304 are also shown, which may be part of transmit modulators 216A–N or form another part of digital transmitters 210A–N. As discussed later on, transmit modulation typically refers to the orthogonal code covering or channelization, and spreading operations. Prior to application of orthogonal coding or spreading user data signals carried by each channel are generally convolutionally encoded, with repetition, and interleaved in order to provide error detection and correction functions. The encoding provides data "symbols" which are then processed to form the desired communication signals. Techniques for convolutional encoding, repetition, and interleaving are well known in the art.

The interleaved data symbols may be multiplied by a binary $PN_U$ sequence in a logic element 306. This sequence is provided by output of a long PN code generator 38, typically also clocked at the system spreading code chip rate, and then decimated in a decimator 310 to provide a lower rate such as 19,200 bps. The output of the decimator is connected to one input of logic element 306, here a multiplier, with a second input connected to interleaver 304. In the alternative, the output of decimator 310 could be connected in series with other elements such as a multiplier 320 to be multiplied by resulting covered data. When Walsh code and $PN_U$ sequences consist of binary '0' and '1' values, instead of '–1' and '1', the multipliers can be replaced by logic elements such as exclusive-OR gates, as is well known.

Code sequence $PN_U$ corresponds to a unique PN phase offset for a known long PN code used in the communication system. This offset sequence is generated by or for each user terminal and can be constructed using a variety of known elements configured for this purpose. A unit address or user ID may also be used to provide additional user terminal identification or security. The format of the $PN_U$ sequence should conform to that of the Walsh codes applied to logic element 306. That is, either '–1/1' or '0/1' values are used together, and conversion elements can be used on the output of a code generator to convert a '0/1' type sequence to a '1/–1' type sequence, as required. In the alternative, a non-linear encryption generator, such as an encryptor using the data encryption standard (DES), may be utilized in place of PN generator 318 as desired. The $PN_U$ sequence may be either assigned for the duration of a given link or permanently to one unit.

The interleaved data symbols 312 from interleaver 304, or from the output of logic element 306, are then orthogonally encoded or covered with an assigned orthogonal code sequence, here a Walsh function or code, supplied by at least one code generator 322. The code from generator 322 is multiplied by or combined with the symbol data in a logic element 320. The orthogonal function is typically docked in at the same rate as the spreading code chip rate. It is also possible to employ other known elements such as a Fast Hadamard Transformer to perform the orthogonal encoding process. This type of processing is shown in further detail in U.S. patent application Ser. No. 08/424,773, entitled "Method And Apparatus For Joint Transmission Of Multiple Data Signals In Spread Spectrum Communication Systems", filed Apr. 18, 1995, and incorporated herein by reference.

The modulator circuitry also includes at least one and generally two PN generators, 330 and 332, which generate or provide the two different short $PN_I$ and $PN_Q$ spreading codes or code sequences for the In-Phase (I) and Quadrature (Q) channels. This code generation can also form a functional part of one or more control processors or storage elements used in the gateway. In the alternative, these generators could be time shared among several receivers using appropriate interface elements. Exemplary generation circuits for these sequences is well known, and is disclosed in U.S. Pat. No. 5,228,054, referred to above. These PN generators can also be responsive to an input signal corresponding to a beam or cell identification signal from the control processor so as to provide a predetermined time delay or offset for the PN sequences. Although only two PN generators are illustrated for generating the $PN_I$ and $PN_Q$ sequences, it is readily understood that many other PN generator schemes may be implemented within the teachings of the invention, as would be known.

The orthogonally covered symbol data 324 output by logic element or multiplier 320 is then combined with or multiplied by the $PN_I$ and $PN_Q$ spreading codes using a pair of logic elements or multipliers 324 and 326, respectively. The resulting signals are then transferred to appropriate power control and amplification circuitry, transmit power controller 212 and analog transmitter 224. Here, they are modulated onto an RF carrier, typically by bi-phase modulating a quadrature pair of sinusoids that are summed into a single signal with other traffic channel signals, along with the pilot and any setup channel signals. Summation may be accomplished at several different points in the signal processing such as at baseband or intermediate frequencies, either before or after combination with the PN sequence associated with the CDMA channel.

Figure 4A:
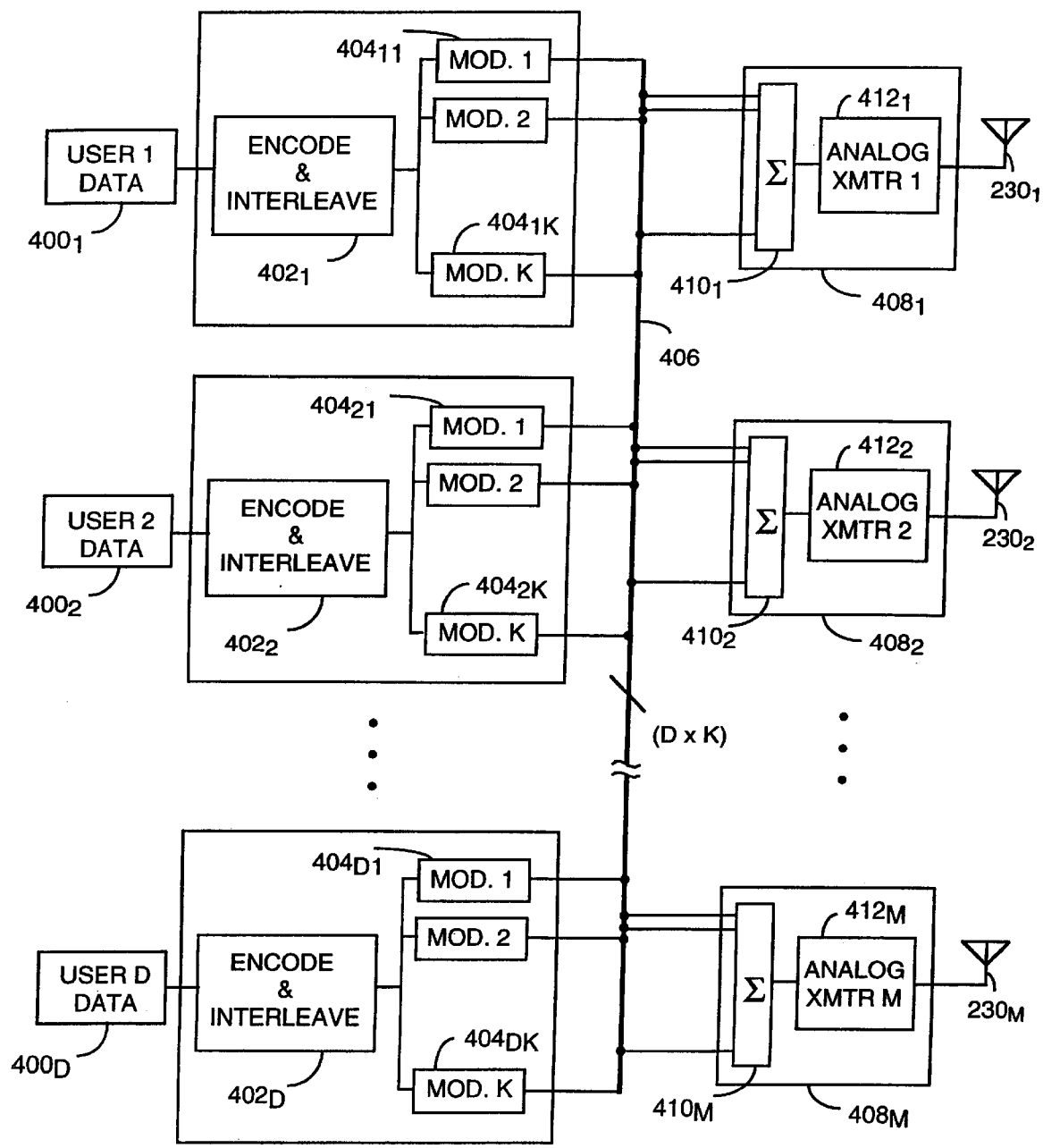
FIG. 4a illustrates a typical gateway architecture using multiple independent data modulators, combiners, and analog transmitters.
Figure 4B:
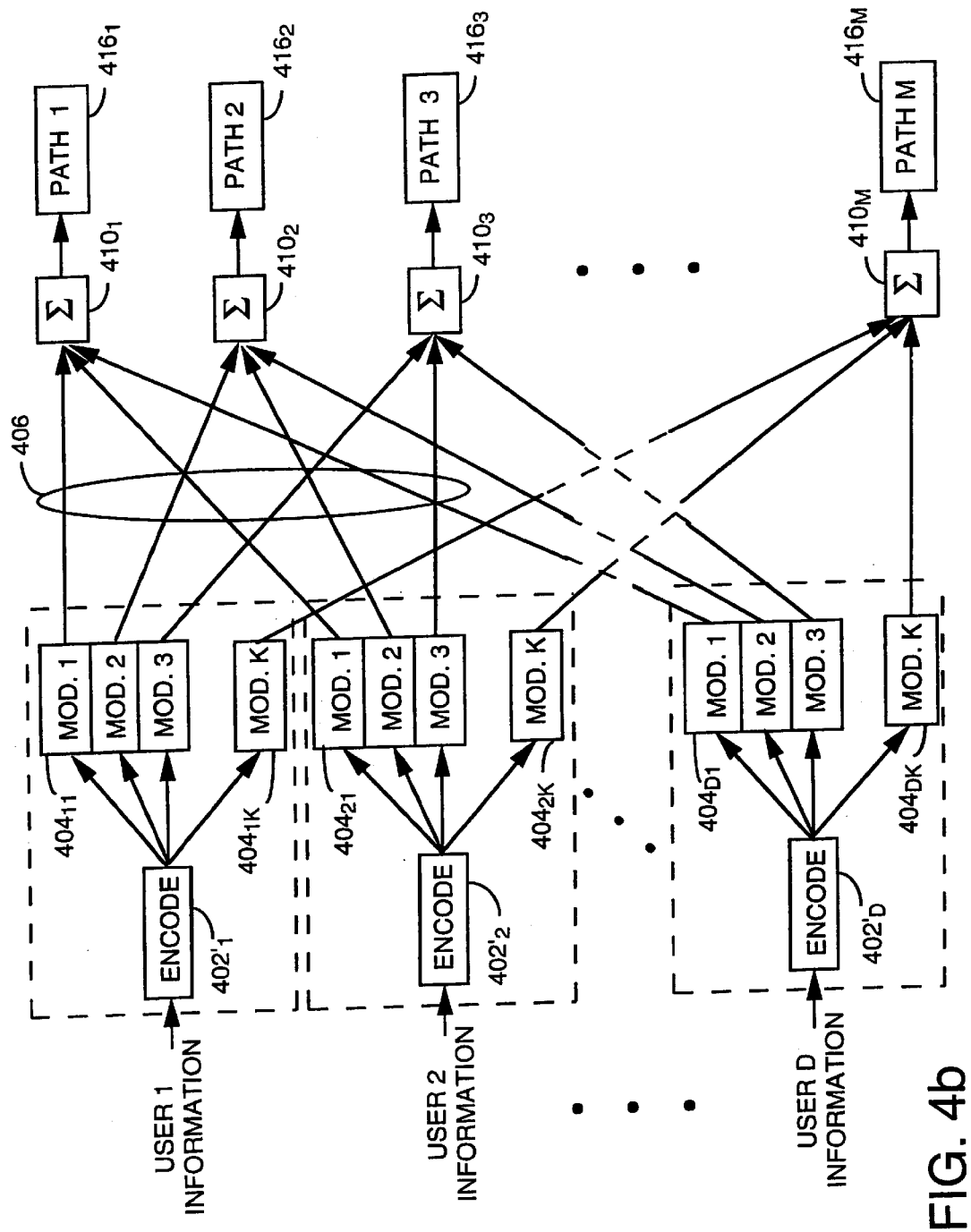

A typical overall gateway transmission system design for processing data signals for many users and diversity paths at one time and transmitting them to targeted users or recipients is shown in FIGS. 4a and 4b. FIG. 4a shows a specific data bus structure while FIG. 4b shows a more generalized form including an analog transfer path. In FIGS. 4a and 4b, user data 400 ($400_1$–$400_D$), that is data intended for a given user, traffic, or communication channel D (1 of 128, D=1, 128) is input to the gateway. Data $400_D$ is transferred in a predetermined data frame format, with preselected periodicity, to one of a series of encoder/interleaver elements 402 ($402_1$–$402_D$), where the data is interleaved and encoded. In FIG. 4b, the interleaving portion is omitted as optional for elements 402' ($402'_1$–$402'_D$).

The data for each traffic (or other) channel is then modulated in a modulator 404 ($404_{11}$–$404_{DK}$), there being several such modulators to establish a desired number of K diversity mode signals, signal paths, or circuits for a given user. That is, it is desirable to be able to transmit the signals for a given channel over multiple signal paths (antennas, sub-beams, transmitter paths, etc.) and a typical system could allow for say up to 64 such diversity modes. Therefore, K would typically be as large as 64, although other numbers of modulators can be used depending on known design factors such as a desired maximum amount of diversity allowable, system complexity, cost, and reliability. In this example, there are 64 modulators (K=64) for each user data channel D input (maximum value for D is maximum number of orthogonal codes). This results in a substantially large number of modulators and outputs to control.

Note that these modulators typically reside in digital transmitters as discussed earlier. Here, transmitter controllers and power control elements have been omitted for purposes of clarity in illustration. The modulators can comprise or use several known processing elements including, but not limited to, digital signal processors, which are used to prepare the signal for transmission. While covering and spreading are discussed below and in the example modulation circuti of FIG. 3, for purposes of clarity in explanation, it should be dear that orthogonal covering or channelizing is not required for operation of the invention, and is not used in some applications. The invention reduces complexity by reorganizing the manner in which data is processed, regardless of the modulation scheme being used (CDMA, spread-spectrum, other).

The outputs from each modulator 404 ($404_{11}$–$404_{DK}$) are then transferred to input stages of each of the analog transmitters or transmission stages 408 ($408_1$–$408_M$) employed by the gateway to transmit their respective signals. This transfer occurs over a data bus or a series of known cables, signal conductors, data busses, or other known distribution mechanism, 406. Bus 406 is generally D×K data words wide, with each word being the number of bits used for each symbol. Again, the total number M of analog transmitters $408_M$ depends on known system design factors such as number of antennas, satellites, system complexity, diversity modes being processed, CDMA channels and channel capacity, and so forth. A typical number of analog transmitters $408_M$ would be at least 3 (M=3) and more probably on the order of one for each sub-beam (CDMA channel), in one or more beams (frequencies), on possibly 4 or more satellites. A typical satellite communication system might employ 13 sub-beams on or with 1 to 16 beams being transferred by the gateway through 2 to 4 satellites at a time, or a total of 32 to 832 analog transmitters (M=32 to 832) in the gateway. Additional polarization modes and other factors can increase, or decrease, the number of analog transmitters $408_M$ employed, as would be known.

Each of the analog transmitters 408 ($408_1$–$408_M$) uses a signal combining stage or element $410_M$ ($410_1$–$410_M$) and a transmission amplifier or power stage 412 ($412_1$–$412_M$), here labeled as analog transmitters. Combiner 410 ($410_1$–$410_M$) combines up to D user channels of modulated data symbols into a single signal for transmission over an analog transfer path 416 ($416_1$–$416_M$), which includes an analog transmitter and an antenna 230, with the maximum value of D based on the number of orthogonal codes used or available, as above. Elements to combine or multiplex signals in a D:1 (here, 128:1) combination or mapping are well known in the art, and not described in further detail here. Analog transmitters 412 ($412_1$–$412_M$) are connected to antennas 230 ($230_1$–$230_M$), the number being dependent upon the system design and gateway design factors well understood in the art. Since each gateway typically has 4 or fewer antennas, although more can be used, several analog transmitters could be connected to an antenna through other coupling and summation elements, devices, or circuits, not shown.

As discussed above, one problem with the typical configuration shown in FIGS. 4a and 4b is the overall magnitude of data that is being transferred to generate or form the output signals from analog transmitters 412 ($412_1$–$412_M$). If a typical 8 bits per symbol sample is used with a two-times (2×) oversampling rate, and a typical 1.288 Mcps chip rate for the PN spreading code in the modulator, on each of an in-phase (I) and quadrature (Q) channel, then there are about 40 Mbps of data on the output of each diversity mode modulator $404_{DK}$. Note that in FIG. 4b the I and Q channels are shown as single common lines for clarity in illustration. However, there are up to 128 user data signals (minus pilot, paging, and synchronization channels with their own data requirements), having from 2 up to 64 diversity modes available to each, which results in data busses trying to transfer on the order of 40×128×(2 to 64) Mbps (10 to 327 Gbps) of data among or to the various analog transmitters. The transfer of this much data is not practical with current systems.

In addition, in order to combine the various channel signals, it can be appreciated that their data frames or encoded and spread data symbols must be synchronized to within less than one-half of the chip timing for the PN spreading codes being used. It is readily seen that on this scale, maintaining that level of synchronization for this number of signals and exercising precise control over the transfer of data are themselves extremely burdensome and impractical tasks. It requires synchronizing a large number of dynamically changing signals with 0.4 microsecond accuracy, which may not be possible in most commercially viable systems, even with the available IFU signals.

The present invention reduces the burden of data transfer, making more cost efficient and reliable transmission stages for gateways possible. This is accomplished by separating certain signal processing functions into modular groups associated with the individual analog transmitters. By transferring the data to appropriate modules for processing at rates commensurate with the signal processing in a module, the data transfer rates are greatly reduced over that required for conventional processing transfers. The rates used for individual modules or signal processing operations are lower than those required to transfer processed data to all of the analog transmitters at one time. By multiplexing this data transfer such as through the use of packetizing channel data together at a lower data rate, and then transferring it from D inputs to M transmitter elements for processing, the transfer rate is reduced.

Figure 5A:
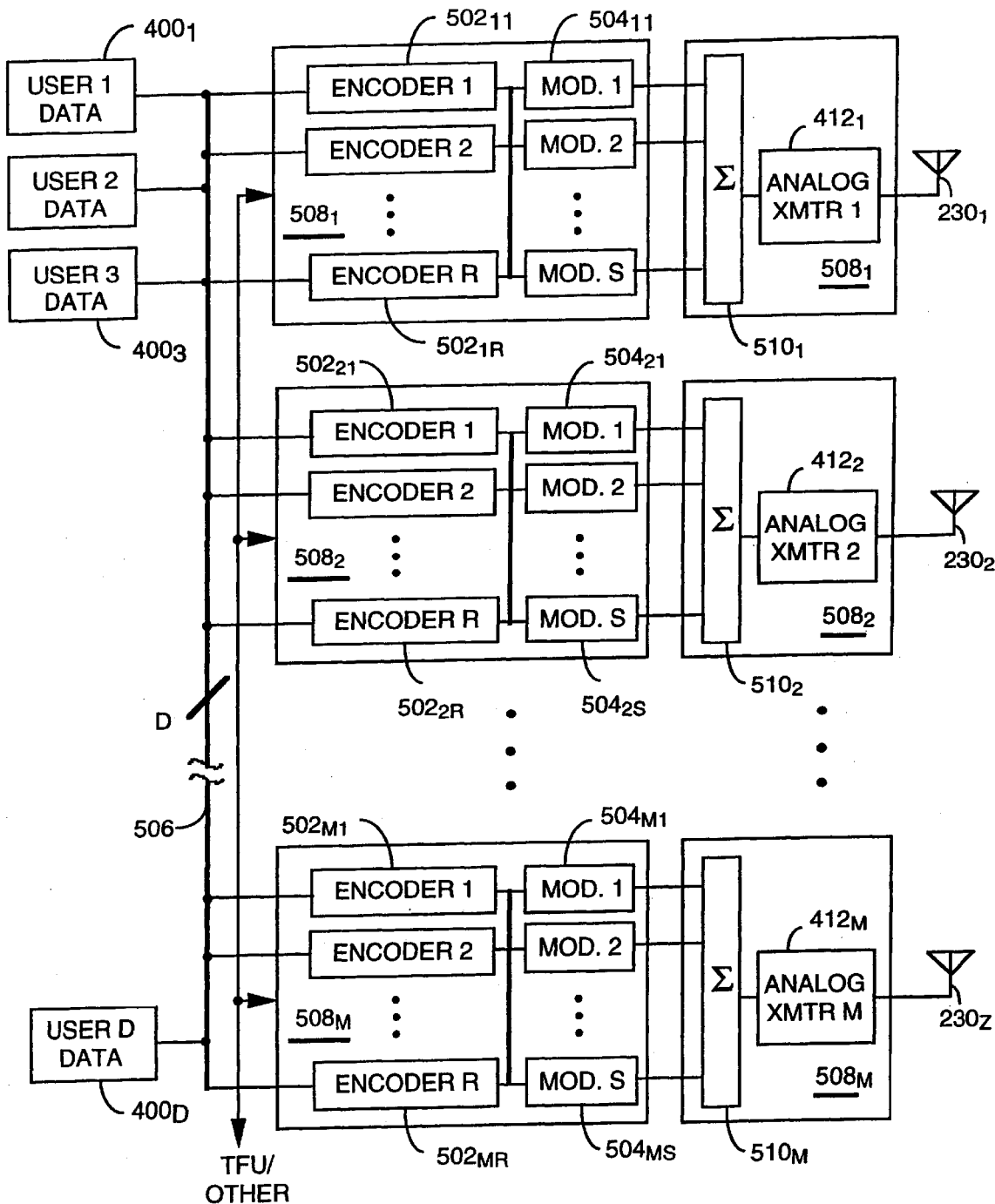
FIG. 5a illustrates a new gateway architecture using multiple distributed data processing and transmission modules.
Figure 5B:
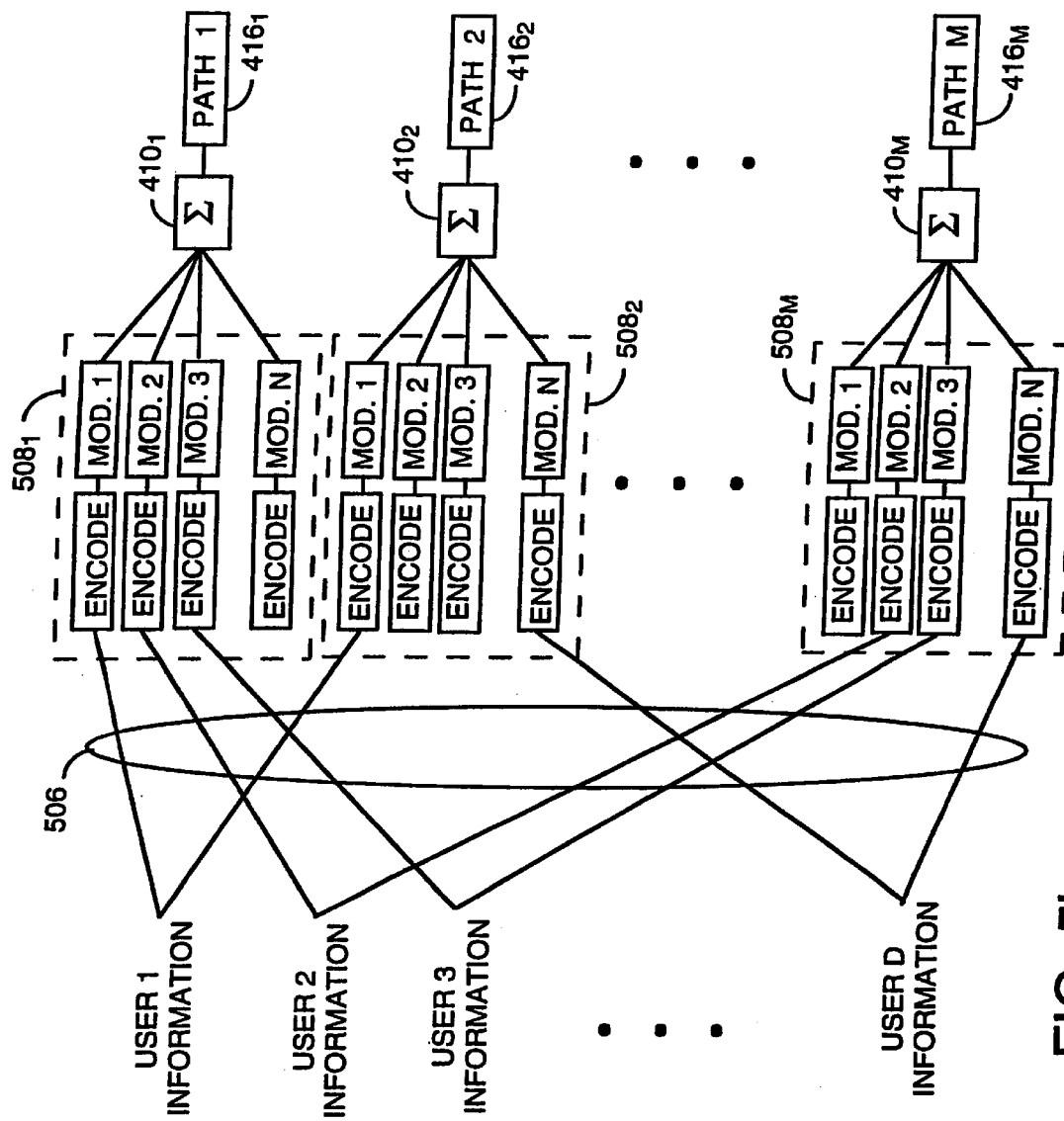

This new technique is shown in FIGS. 5a and 5b, which illustrate a new gateway architecture using multiple distributed data transmitters and modular transmission processing elements. In FIGS. 5a and 5b, the data symbols from each user channel $400$ ($400_1$–$400_D$) are transferred directly over a data bus, cables, or other known distribution mechanism, $506$ to a series of transmission stages, sections, devices, or modules $508$. Within each transmitter or transmission module $508$ ($508_1$–$508_M$), there is an array of encoder/interleavers $502$ ($502_{11}$–$502_{MR}$) and corresponding modulators $504$ ($504_{11}$–$504_{MS}$), which are used to process the signals in a manner similar to that previously discussed. Each transmission module $508$ of the M modules (M being as before), employ a number of input stages or processing paths equal to the number of channels (R and S, bounded by the orthogonal codes/code length) that can be processed by that transmission module. Assuming the coding structure described above, that would be a maximum of 128 channels, minus pilot channel. Therefore, R and S would be D or less from the above example.

In the illustrated embodiment, each signal transfer or processing path uses an encoder/interleaver $502_R$ and a modulator $504_S$. Although there are up to 128 per transmission module or corresponding transmitter (here N=S=R= 128), they form a more compact interconnected module than used in the previous structure. However, the number of encoder/interleavers $502_R$ and modulators $504_S$ used in each transmission module $508$ does not have to be equal to the maximum, or even permanently fixed. That is, a one-to-one correspondence is not required. Fewer elements can be used based on system design characteristics that limit the average number of diversity paths used or data being transferred along a given analog path. System testing or historical data can be used to tailor or adjust this number. In addition, some of these elements can be time shared. In a preferred embodiment, fewer than D encoder/interleavers $502_R$ are used to serve as input stages for a larger number of modulators $504_S$. For example, as few as 8 to 10 interleavers may accommodate the signals processed by 32 to 64 modulators, or an even larger ratio could be used. Those skilled in the art will understand how to assign fewer or more elements to accomplish these functions based on a specific communication system design and capacity.

The inputs for encoder/interleavers $502_R$ and modulators $504_S$ can also be controlled or assigned in several ways. That is, depending on the number of elements used, each one can have a preassigned channel over which to receive input. In this configuration, encoder/interleaver $502_1$ always receives data from user or traffic channel 1, $502_2$ receives from traffic channel 2, and so forth. Modulators $504_R$ could be assigned in a similar fashion. Where there are fewer encoder/interleavers $502_S$ than channels, they can be prearranged groups of channels. Alternatively, and more preferably, encoder/interleavers and modulators are used in an order of availability. That is, the first traffic or user data channel is input to the first available interleaver, based on not being in use and some predetermined order of usage across the set of elements. The interleaver outputs would then be transferred to modulators using a similar scheme. Elements such as the control processor or gateway transmit processors can be used to determine the order and location for transfer of these signals The encoder/interleavers and modulators can be constructed as inexpensive modules that can easily be manufactured and grouped with the analog transmitters in electronic sub-systems for the gateway RF processing sections. In some configurations, the encoder/interleavers and modulators can be combined into single modules, forming encoding modulators tat perform the entire encoding, interleaving, modulation processing in a single circuit, element, or device. This may require more elements to form a transmission module in this situation, since time sharing of encoders/interleavers would be substantially reduced or eliminated.

The encoder/interleaver and modulator elements may also be capable of being reassigned across the "boundaries" of the transmission modules as shown. That is, these elements are grouped together to form transmission modules based on element task assignments, but not on physical location within a gateway. These elements could be implemented in larger arrays using well known components such as, but not limited to, digital signal processors, microprocessors, encoders, modulator integrated circuits, memory elements, and so forth, which are programmed or connected together using electronic switching elements well known in the art. The switching elements can be used by control elements or processors to select to which analog transmitter the elements or devices they are connected. This can allow reallocation of resources as need for particular analog paths. This further reduces the number of elements needed in some systems based on lower average diversity mode usage. That is, fewer modulators and such need to be reserved for use.

One advantage of the above arrangements is that the input data for each encoder, and, consequently, each analog transmission section, is transferred over bus or mechanism $506$ typically at a rate on the order of 9600 bps or less; or whatever is desired in the particular system. Therefore, the main data busses in a gateway can now operate at greatly reduced data transfer rates, are far less complicated or complex, and much simpler to control. In addition, the number of physical inter-connections needed to create this data transfer is greatly reduced as well. It only requires the N channels of input (S where smaller than N) to each of the analog transmitters (M), which can be configured as a D data word wide bus (here, max D=128). The reduction in complexity can also be seen in FIG. 5b where each user information input is only transferred to some of the analog transmitters, that is, K<M, and all interconnections do not have to be maintained as in FIG. 4a.

Once the encoded and modulated data for each channel is received at the input to the analog transmitters, the data for each of the user signals is automatically synchronized for combination with the data for other user signals for that transmitter. This is the result of using common clocks and other signals to control each of the processing chains within each transmission module, so that time synchronization is automatically maintained throughout the transmission module processing. This timing control is shown as the TFU/OTHER input, command, or control line in FIG. 5a, which is connected to the TFU, processor circuits discussed above, or other known timing control and clock signal elements.

Figure 6:
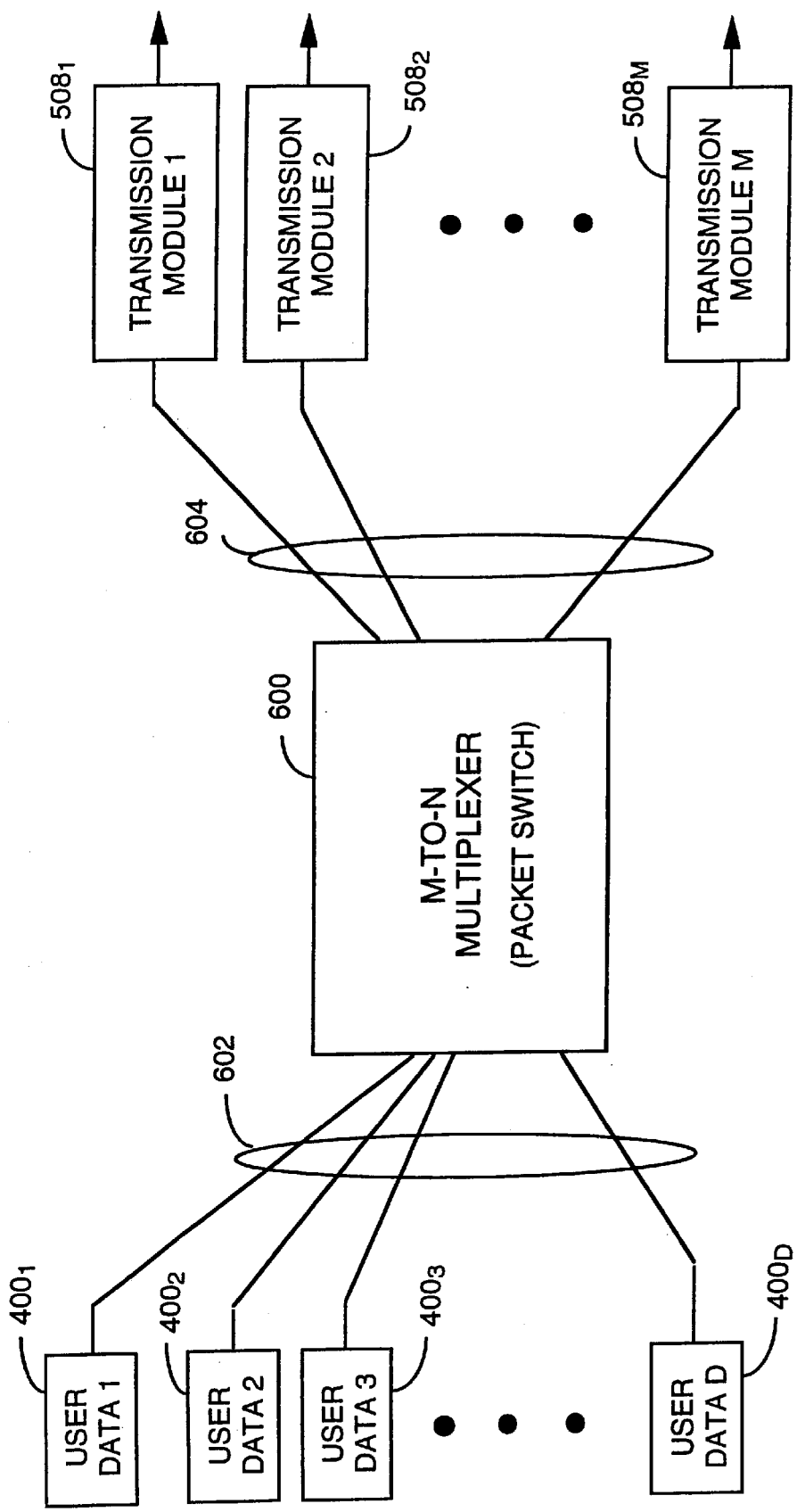
FIG. 6 illustrates a multiple distributed transmission module architecture using packet switching.

Since the data symbols are being transferred from D or N (S) elements to M elements, a N-to-M multiplexing or data transposition element can be used to make more efficient use of the data paths between these elements. This is shown in FIG. 6, where a multiplexing element 600 is used to receive data symbols on a data bus or input lines 602, and transfer them onto one or more output data busses or lines 604 leading to the various transmission modules 508. Multiplexing element 600 can be constructed as a packet switching element or packetizer, using techniques and apparatus well understood in the art. As seen in FIG. 6, data from each user channel D is transferred to one or more transmission modules 508 using multiplexer/packet element 602. The data input over bus 602 typically comprises 9600 bps user data plus some additional overhead information to indicate to which transmission modules or paths the data should be transferred. An exemplary embodiment would allocate approximately an additional 50 percent data rate to account for the overhead information. Therefore, transfers on the input side of multiplexer 600 would occur at roughly 9600× 1.5 bps or 14400 bps, which is still well below the previous requirements for data transfers in the gateway using a conventional approach.

The output side of multiplexer/packet element 600 transfers signals or data for each user channel 400 (D) to the appropriate transmission modules. Multiplexer/packet element 600 uses the overhead information as to which transmission module or path receives which user data to configure the output data. The user data transfer occurs by transferring the data from all users intended for each transmission module to one module at a time. This results in a data transfer rate on the order of 9600 bps, with the overhead information removed, times the number of user signals being transferred to each transmission module. The maximum for this latter value is the maximum for N in the present example, resulting in a maximum transfer rate of 9600× 128=1.22 Mbps. The number of users sending signals to each transmission module is likely to be substantially less than 128 at any given time since that would imply a diversity of M for every user signal (each goes to every one of M transmitters). The lower average value for D on data bus 604, further reduces the transfer rate. This approach further reduces the amount of data that needs to be transferred at any time within the gateway.

The previous description of the preferred embodiments is provided to enable any person skilled in the art to make or use the present invention. The various modifications to these embodiments will be readily apparent to those skilled in the art, such as the number and type of antennas and analog transmitters, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What I claim as my invention is:

1. A method for transmitting signals in a spread spectrum communication system in which information is communicated using orthogonally encoded channels on common carrier communication signals, comprising the steps of:

receiving a plurality of user data signals intended for transmission to system users;

segmenting said subscriber data signals into diversity user signals on the basis of at least one diversity subscriber signal for each of one or more analog communication paths over which information is to be transferred to a subscriber; and transferring each diversity user signal to a transmitter module in which they are modulated using preselected pseudorandom noise (PN) type code sequences, summed to be transferred along a common analog communication path, and transferred to a common analog transmission circuit.

2. Apparatus for transmitting signals in a spread spectrum communication system in which information is communicated over orthogonally encoded communication signal channels within communication signals transmitted by system base stations, gateways, and satellites to system user terminals, comprising:

means for segmenting said subscriber data signals into diversity user signals on the basis of at least one diversity subscriber signal for each of one or more analog communication paths over which information is to be transferred to a subscriber; and a plurality of transmitter modules connected to receive diversity user signals and to modulate them using preselected pseudorandom noise (PN) type code sequences, summing modulated signals to be transferred along a common analog communication path, and transferring them to a common analog transmission circuit.

3. A method for transmitting signals in a communication system in which separate user information signals are communicated using common carrier communication signals, comprising:

receiving digital user data signals intended for transmission to one or more users in said system;

transferring each user data signal to one or more of a plurality of transmission modules, each module being associated with a corresponding analog output communication path over which data signals are to be transferred, the total number of modules to which each user data signal is transferred being one module for each analog communication path it is desired to transfer said user data signal over;

processing each user data signal in each transmission module to which transferred to produce a user communication signal;

summing user communication signals from each transmission module to be transferred over a common analog communication path to form a single common communication signal; and transferring each common communication signal to a single analog transmitter associated with said transmission module.

4. The method of claim 3 wherein each transmission module comprises a preselected set of encoders coupled to a preselected set of modulators.

5. The method of claim 3 wherein said analog transmitters are provided within a gateway type base station and at least one satellite based is employed to transfer said communication channel signals to user terminals within said communication system from said analog transmitters.

6. The method of claim 5 wherein there are at least two satellites are in communication with said gateway at any given time.

7. The method of claim 3 further comprising applying a common timing signal to each element within a given transmission module.

8. The method of claim 3 further comprising applying a N-to-M multiplexing function of up to N digital data signals before transferring them to M transmission modules.

9. A method for transmitting signals in a spread spectrum communication system in which information is communicated using orthogonally encoded channels on common carrier communication signals, comprising:
- receiving digital user data signals intended for transmission to one or more users in said system;
- transferring each user data signal to one or more of a plurality of transmission modules, each module being associated with a corresponding analog output communication path over which data signals are to be transferred, the total number of modules to which each user data signal is transferred being one module for each analog communication path it is desired to transfer said user data signal over;
- processing each user data signal in each transmission module to which transferred to produce a spread communication signal;
- summing spread signals for separate users from each transmission module to be transferred over a common analog communication path to form a single spread spectrum communication signal; and
- transferring each said spread communication signal to a single analog transmitter associated with said transmission module.

10. Apparatus for transmitting signals in a communication system in which separate user information signals are communicated using common carrier communication signals, comprising:
- means for receiving digital user data signals intended for transmission to one or more users in said system;
- one or more of a plurality of transmission modules, each module being associated with a corresponding analog output communication path over which data signals are to be transferred, the total number of modules to which each user data signal is transferred being one module for each analog communication path it is desired to transfer said user data signal over;
- means for processing each user data signal in each transmission module to which transferred to produce a user communication signal;
- means for summing user communication signals from each transmission module to be transferred over a common analog communication path to form a single common communication signal; and
- means for transferring each common communication signal to a single analog transmitter associated with said transmission module.

11. The apparatus of claim 10 wherein the number of transmission modules being such that one module is available for each analog transmission path over which user signals are to be transferred.

12. The apparatus of claim 10 further comprising means for applying a common timing signal to each signal processing element within a given transmission module.

13. The apparatus of claim 10 wherein each analog transmission path comprises a corresponding analog transmitter.

14. The apparatus of claim 10 further comprising means for covering encoded data symbols for each analog communication path intended for a given user with one of a plurality of orthogonal functions, the same function being used for each analog communication path for a given user to generate representative orthogonal user channel data for a user channel operating through a corresponding analog transmitter.

15. The apparatus of claim 10 further comprising a N-to-M multiplexer connected to receive up to N digital data signals before transferring them to M transmission modules.

16. The apparatus of claim 10 wherein said analog transmitters are provided within a gateway type base station in a wireless communication system having at least one satellite based repeater and are employed to transfer said communication channel signals to user terminals within said communication system.

17. The apparatus of claim 16 wherein there are at least two satellites are in communication with said gateway at any given time.

18. Apparatus for transmitting signals in a spread spectrum communication system in which information in the form of digital user signals is modulated communicated using common carrier communication signals, comprising:
- a plurality of transmission modules connected to receive digital user data signals intended for transmission to one or more system users, each module being associated with a corresponding analog output communication path over which data signals are to be transferred, the total number of modules to which each user data signal is transferred being one module for each analog communication path it is desired to transfer said user data signal over, each module comprising:
  - a series of encoders for encoding digital data signals received by each transmission module to produce encoded data symbols;
  - modulation means for spectrum spreading encoded data symbols forming user signals using at least one preselected pseudorandom noise (PN) spreading code in said transmission module; and
  - a summation element connected to receive and sum together spread signals to be transferred over a common analog communication path to form a single spread communication signal; and
- means for transferring each spread communication signal to a single analog transmitter associated with each of said transmission modules and a given analog signal output path.

* * * * *